United States Patent [19]

Ream et al.

[11] Patent Number: 4,540,552
[45] Date of Patent: Sep. 10, 1985

[54] PROCESS FOR THE REMOVAL OF ACID GASES FROM A GAS MIXTURE

[75] Inventors: Bernard C. Ream; Cyril Tellis, both of Charleston, W. Va.

[73] Assignee: Union Carbide Corporation, Danbury, Conn.

[21] Appl. No.: 613,456

[22] Filed: May 24, 1984

[51] Int. Cl.³ .......................... C01B 17/16; C01B 7/00
[52] U.S. Cl. .................................. 423/226; 423/236; 423/240; 423/242
[58] Field of Search ............... 55/68, 71, 73; 252/189, 252/190; 423/226, 236, 240 R, 243

[56] References Cited

U.S. PATENT DOCUMENTS 3,214,892 11/1965 Holbrook .
3,876,509 4/1975 Davis et al. ........................... 203/38

FOREIGN PATENT DOCUMENTS 1559145 1/1969 France ................................ 423/226
288219 6/1966 U.S.S.R. .

OTHER PUBLICATIONS

Technical Production of Ethylene Carbonate, Springmann, H., Fette, Seifen, Anstrichm, 1971, 73(6), pp. 396–399.
Mechanisms of Ring Opening of Oxirans by Acids in Aqueous and Nonaqueous Solvents, Gérard Lamaty et al., J. Chemical Society Perkin II, 1975, #10, pp. 1119–1124.

Primary Examiner—Earl C. Thomas
Assistant Examiner—Robert Alway
Attorney, Agent, or Firm—David Fink

[57] ABSTRACT

A process for the removal of acid gases which are reactive with ethylene oxide from a gas mixture containing carbon dioxide, comprises contacting the gas mixture with ethylene carbonate containing sufficient amount of ethylene oxide, whereby the ethylene oxide reacts chemically with the acid gases to produce reaction products which are more easily removable from the gas mixture.

10 Claims, No Drawings

PROCESS FOR THE REMOVAL OF ACID GASES FROM A GAS MIXTURE

FIELD OF THE INVENTION

The invention relates to a process for the removal of acid gases from a gas mixture and particularly, to a process for the removal of acid gases primarily other than carbon dioxide from a gas mixture which includes carbon dioxide. More particularly, the invention is directed to a process for primarily removing hydrogen sulfide, carbonyl sulfide, sulfur dioxide, hydrogen chloride, hydrogen bromide, hydrogen cyanide, mercaptans, and ammonia from a gas mixture which includes carbon dioxide.

DESCRIPTION OF THE PRIOR ART

In many commercial processes which utilize gas mixtures, the presence of acid gases in the gas mixture can cause problems in the chemical processes and/or present an adverse effect on the environment. As a result, the prior art literature includes many articles, patents, and books relating to the removal of acid gases from gas mixtures.

Generally, the gas mixtures include hydrocarbons and synthesis gas. Synthesis gas is primarily hydrogen and carbon monoxide but usually includes relatively small amounts of carbon dioxide as well as other acid gases.

In many commercial operations using a gas mixture, the presence of carbon dioxide in the gas mixture presents no problems for the chemical processes. In addition, the carbon dioxide is not considered hazardous to the environment. Thus, the removal of carbon dioxide from a gas mixture in such a situation will constitute an unnecessary expense. Prior art processes for removing acid gases usually made no distinction between carbon dioxide and other acid gases except for the processes which are specific to a single acid gas such as hydrogen cyanide.

It can be appreciated that it would be wasteful to remove carbon dioxide along with other acid gases in a commercial operation in which the carbon dioxide presents no problems. The present invention overcomes this disadvantage and provides an effective process for the removal of acid gases other than carbon dioxide from the gas mixture which includes carbon dioxide.

The following is a brief description of some pertinent patents relating to the removal of acid gases from the gas mixture.

Russian Pat. No. 288,211 discloses a process for the removal of hydrogen sulfide from hydrocarbon gases by reacting the gases with an olefin oxide such as ethylene oxide or propylene oxide so that bis-(hydroxyalkyl) sulfides are produced. The patent discloses that the reaction temperature is in the range of from 40° C. to 90° C. and that the olefin oxide is used either in a gaseous state or a liquified state under pressure.

U.S. Pat. No. 3,214,892 relates to the use of ethylene carbonate or a solution of ethylene carbonate for separating acid gases, particularly carbon dioxide, from non-acidic gases. The patent describes this process as a selective removal of acid gases from a gaseous mixture. The patent discloses that it is advantageous to use an inert solvent for the ethylene carbonate so that the process can be carried out at ambient temperatures. An inert solvent is defined in the patent as one which is unreactive with the ethylene carbonate and other solvent constituents, and the acid constituents of the gas. Propylene carbonate is disclosed as the preferred solvent because of its selective solubility for carbon dioxide. If ethylene carbonate is used directly, then the patent discloses that the operating temperature must be in excess of the melting point of ethylene carbonate, 36.2° C. The patent discloses the use of pressures in a range from about 200 psig to 2,000 psig. It can be appreciated that use of high pressure for the process of the patent is important because the acid gas removal is brought about by the solubility of the acid gases in ethylene carbonate and it is well known that the solubility of a gaseous material is generally improved with increased pressure.

SUMMARY OF THE INVENTION

The present invention involves a process for the removal of acid gases primarily other than carbon dioxide from a gas mixture containing carbon dioxide. The process comprises contacting the gas mixture with ethylene carbonate under temperature and pressure conditions so that a portion of the ethylene carbonate decomposes to produce ethylene oxide and carbon dioxide, and the ethylene oxide reacts chemically with the acid gases to produce reaction products.

Generally, the acid gases removed by the instant process include hydrogen sulfide, carbonyl sulfide, sulfur dioxide, hydrogen chloride, hydrogen bromide, hydrogen cyanide, mercaptans, and combinations thereof.

Generally, it is known that the thermal decomposition of ethylene carbonate is substantial at temperatures greater than about 170° C. However, at lower temperatures thermal decomposition of ethylene carbonate also occurs.

Preferably, a catalyst is used in conjunction with the ethylene carbonate in order to increase the decomposition of the ethylene carbonate at a relatively low temperature. Appropriate catalysts are well known and include alkali metal halides, tertiary amines, quaternary ammonium halides, amine hydrohalides, metal oxides, polyhalogenated hydrocarbons, pyridine, and disodium phthalate.

DISCUSSION

The acid gases in the gas mixtures relating to the invention are regarded to be impurities and consequently, are present in relatively low concentrations. As a result, the amount of ethylene oxide needed to react with the acid gases to practice this invention is a very small quantity. The invention, however, is not limited to the treatment of impurity quantities.

In the practice of the invention, the ethylene oxide is dispersed throughout the ethylene carbonate as it is produced by decomposition of the ethylene carbonate and the acid gases can react with the ethylene oxide at all sites throughout the ethylene carbonate. This enables a controlled and possibly complete reaction of the acid gases in a single pass, if desired. In contrast, a reaction between the acid gases in a mixture and ethylene oxide supplied as disclosed in the aforementioned Russian Pat. No. 288,211 would require a complex arrangement in practice in order to react all of the acid gases and avoid too much ethylene oxide.

It is known that substantial thermal decomposition of ethylene carbonate does not occur until temperatures greater than about 170° C. are achieved. However, in the practice of this invention, only a portion of the ethylene carbonate is needed to be converted to ethylene oxide to react with the small amounts of impurity acid gases to be removed. As a result, the invention can be practiced at much lower temperatures with the caveat that sufficient ethylene oxide is generated by decomposition, or is provided by separate addition, to react with the desired amount of the acid gases to be removed. Typically, the ethylene carbonate is maintained at a temperature between about 50° C. and about 100° C. for a sufficient time to generate the desired amount of ethylene oxide.

The thermal decomposition of the ethylene carbonate produces carbon dioxide and ethylene oxide. The rate of reactivity of the ethylene oxide is greater with the acid gases other than carbon dioxide, so that the reaction products are primarily from the acid gases other than carbon dioxide, where ethylene oxide is caused to be admixed with such gases at reaction conditions.

The use of a catalyst with the ethylene carbonate enables an enhanced rate of thermal decomposition at relatively low temperatures. For example, catalysts which are used to form ethylene carbonate may be used for decomposing it at another set of conditions. The amount of catalyst employed should be that amount which causes enough of the ethylene carbonate to decompose to provide the required amount of ethylene oxide. Generally, catalytic quantities will suffice, e.g., from about 0.2 to about 1 percent by weight based on the weight of ethylene carbonate being used in the process. In general, tetraethylammonium bromide is a good catalyst for decomposing ethylene carbonate at temperatures less than 120° C.

In a continuous flow through system, the carbon dioxide produced by the decomposition of the ethylene carbonate is convected out of the reaction zone and this is favorable for the decomposition of the ethylene carbonate.

The ethylene carbonate can be used alone or in solutions with propylene carbonate or any solvent which is unreactive at the process conditions with ethylene carbonate such as water, methyl alcohol, ethyl alcohol, acetone, acetonitrile, and the like.

The aforementioned U.S. Pat. No. 3,214,892 discloses use of ethylene carbonate or a solution of ethylene carbonate in an inert solvent for dissolving carbon dioxide as well as other acid gases to remove them from a gas mixture. In contrast, the instant invention reacts the acid gases with ethylene oxide as produced by the thermal or catalytic decomposition of the ethylene carbonate. Although some of the acid gases can be expected to dissolve in the ethylene carbonate or ethylene carbonate solution of the instant invention, this physical removal is incidental and not relied on for the selective removal of the acid gases. Consequently, the temperature of the ethylene carbonate for the instant invention would limit the solubility of the carbon dioxide, which is important to the process of U.S. Pat. No. 3,214,892, but the temperature is not critical for this invention. Acid gases which become dissolved in the ethylene carbonate to any extent have a greater contact time with the ethylene oxide therein and thereby advantageously react to produce reaction products in accordance with the invention. Moreover, the temperature and pressure suitable for carrying out the instant invention are not critically limited to those conditions suitable for good solubility of acid gases in ethylene carbonate or a solution of ethylene carbonate.

The reaction between the ethylene oxide and several of the acid gases occurs as follows:

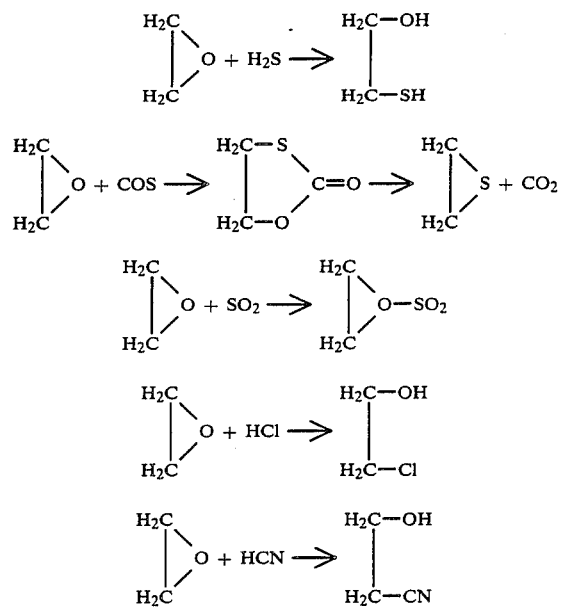

These reactions are exothermic and generate some heat in the treating solution but the reactants are present in small amounts so this would not be expected to alter the prescribed temperature conditions of the process.

The ethylene carbonate itself reacts with ammonia and mercaptans as follows:

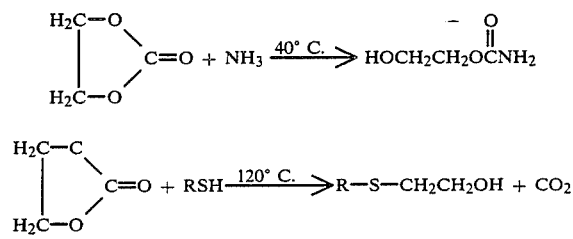

In some instances, a catalyst can be used to enhance the reaction between ethylene oxide and a particular acid gas. For example, trimethylamine promotes the reaction between ethylene oxide and carbonyl sulfide at atmospheric pressure and above 0° C.

Tests can be carried out in accordance with prior art methods for determining the level of acid gases other than carbon dioxide which must be removed. This information enables one to estimate the amount of ethylene oxide which should be made available. Accordingly, the amount of ethylene carbonate, operating conditions, and possibly the use of a decomposition and/or reaction catalyst can be determined in advance of the reaction in order to be certain that a sufficient amount of ethylene oxide will be available for producing reaction products with the acid gases and to ensure that reaction.

The pressure of the reaction is not critical because the treatment is not dependent upon the components being in any one physical state. Temperature and pressure can be correlated to maintain all components of the process in the vapor or liquid state. However, in the normal practice of the invention, the acid gases will be in the vapor state and the ethylene carbonate (with the required amount of ethylene oxide) will be in the liquid state. Thus, process pressures may be subatmospheric, atmospheric or superatmospheric. Usually, pressures ranging from about atmospheric pressure to about 500 psig are employed.

The process temperature is selected to yield enough decomposition of ethylene carbonate to ensure sufficient reaction of ethylene oxide with the desired acid gas impurities to be removed, but the temperature selection is not narrowly critical. Temperatures in the range of about 50° C. to about 150° C. are regarded as being suitable and temperatures between about 80° C. to about 120° C. are believed preferred in the practice of the invention.

If small amounts of ethylene oxide are added to the ethylene carbonate, then the process conditions are not geared in part to the amount of decomposition of ethylene carbonate and the prime consideration becomes the temperature of the reactions to cause the removal of the desired acid gas impurities.

Sufficient contact time between the ethylene oxide and the acid gases enhances reaction and facilitates substantially complete removal of such acid gases. The reaction can be carried out in a single step or in several stages e.g. by incremental reactions at several stages of the process or in one zone. The use of a solvent for the ethylene carbonate provides the additional advantage of increasing contact time. Contact time between the ethylene oxide and the acid gases can be increased by the use of prior art systems such as a tray column or a packed column.

The reaction products produced by the reaction between the ethylene oxide and the acid gases can be removed using prior art methods. It is believed that an activated carbon bed or zinc oxide could be used for the removal of some reaction products.

EXAMPLES

The examples were carried out using a laboratory arrangement. Two separate gas tanks were used for the carrier gases, one for nitrogen and the other for synthesis gas. The acid gases carbon dioxide, hydrogen sulfide, carbonyl sulfide, and sulfur dioxide were supplied from a single gas tank which included one of the carrier gases and these acid gases had a concentration with respect to the carrier of about ten times the concentration of the acid gases needed for the examples. The gas mixture from the gas tank containing the acid gases and the carrier gas was mixed with the appropriate carrier gas from another tank to obtain the concentration of acid gases for the examples.

A separate gas tank was used to supply a mixture of hydrogen chloride and a carrier gas to minimize interference from other species. The hydrogen chloride concentration in this tank was about ten times the concentration needed for the examples. The appropriate gas from another tank was used to reduce the concentration of the hydrogen chloride to the level used in the examples.

In carrying out an example, a gas mixture was formed from gas from a carrier gas tank and gas from the tank containing acid gas and carrier gas. The flow rates of the gases from the tanks were monitored in order to obtain the desired level of concentration of the acid gases. The pressure in pounds per square inch gauge (psig) and volume rate in standard cubic centimeters per minute (SCC/min) of the gas mixture of the gases from the tanks were measured prior to the gas mixture entering a reactor.

The reactor used in the examples was a Pyrex vessel having a diameter of 6 centimeters and about half full with about 275 cubic centimeters of a reactor solution according to the invention. The vessel was heated by the use of a heating tape wrapped around the outside of the vessel. A thermoelectric controller and a thermocouple were used in conjunction with the heating tape to maintain the reactor solution at a predetermined temperature.

The gas mixture was introduced into the reactor solution near the bottom of the vessel so that the gas mixture bubbled up through the solution and thereby, provided contact time between the gas mixture and ethylene oxide in the reactor solution.

The effluent from the reactor was analyzed periodically and the results are reported herein. Ethylene oxide and carbon dioxide in the effluent were measured using an on-line, dual-channel gas chromatograph apparatus. A Bendix Model 2600 with a flame photometric detector was used for sulfur and a Hewlett-Packard Model 5710A gas chromatograph with a selective nitrogen/phosphorus thermionic detector was used for measuring hydrogen cyanide. The hydrogen chloride content was determined by scrubbing the reactor feed and effluent with deionized distilled water, and then measuring the absorbed chloride using an Orion Model 94-17 selective ion electrode.

All interconnections between the gas tanks and the reactor were stainless steel tubing which had been treated to minimize the absorption of gases. Teflon tubing was used for the reactor effluent.

The reactor effluent was passed through a fiber glass-packed separator to eliminate entrained liquid before analysis.

In carrying out the tests, some runs were made in which the gas mixture to the reactor was analyzed for all acid gases except hydrogen chloride. Because of the need to scrub, only one time-averaged measurement of hydrogen chloride in the gas mixture and effluent for a run was obtained.

During a run, the reactor effluent was monitored over a period of several hours. The data measured show the reactor approached steady state conditions after several hours.

EXAMPLES 1 to 5

Examples 1 to 5 were carried out with the following parameters. The reactor solution was 275 cc total. For ethylene carbonate (EC) and water, the solution was 50:50 by volume. For ethylene carbonate (EC), propylene carbonate (PC), and water, the solution was 25:25:50, respectively, by volume. The carrier gas was either synthesis gas (syn gas) or nitrogen and with the added acid gases (including carbon dioxide) comprised the gas mixture fed to the reactor solution. The gas rate to the reactor for the gas mixture was 110 standard cubic centimeters per minute for each of these examples while the gas pressure was 10 psig at the reactor. Table 1 shows the reactor solution temperature.

The results of Examples 1 to 5 are summarized in Table 1. For these examples, the amount of ethylene oxide in the reactor effluent was not measured.

No attempt was made to optimize the results either by increasing the solution temperature, or adding additional catalyst, or by increasing the contact time between the acid gases and the ethylene oxide.

EXAMPLES 6 to 8

Examples 6 to 8 were carried out with the same equipment used for Examples 1 to 5. The gas rate to the reactor for the gas mixture was 100 standard cc per minute for each of these examples while the gas pressure was 10 psig at the reactor. For these examples, the concentration of ethylene oxide in the reactor effluent was measured. The presence of ethylene oxide confirms that the ethylene carbonate is decomposing to ethylene oxide and carbon dioxide in accordance with the instant process for removing acid gases. Table 2 shows the reactor solution temperature.

Table 2 summarizes Examples 6 to 8.

TABLE 1

| Example | Reactor Solution | Catalyst | Carrier Gas | Reactor Solution Temp. °C | Acid Gas ppmv | | | | | $CO_2$ Mole % | Time Hrs. | Effluent Acid Gas ppmv | | | | | Effluent $CO_2$ Mole |
|---|---|---|---|---|---|---|---|---|---|---|---|---|---|---|---|---|---|
| | | | | | $H_2S$ | COS | $SO_2$ | HCN | HCl | | | $H_2S$ | COS | $SO_2$ | HCN | HCl | |
| 1 | EC, $H_2O$ | None | Syn Gas | 80 | 34 | 8.0 | 4.6 | — | 10.9 | 1.64 | 2.0 | 15.5 | 6.29 | 0 | — | Not Meas. | 2.1 |
| | | | | | | | | | | | 2.5 | 25.4 | 6.36 | 0 | — | | 2.0 |
| | | | | | | | | | | | 3.0 | 28.6 | 6.29 | 0 | — | | 2.3 |
| | | | | | | | | | | | 3.5 | 29.6 | 6.29 | 0 | — | | 2.3 |
| 2 | EC, PC, $H_2O$ | None | Syn Gas | 80 | 35 | 8.9 | — | 7.7 | 10.9 | 1.9 | 1.5 | 25.6 | 4.6 | — | 2.7 | 2.8 | |
| | | | | | | | | | | | 2.0 | 30.1 | 6.5 | 0.97 | — | | 2.6 |
| | | | | | | | | | | | 2.5 | — | — | 0.94 | — | | — |
| 3 | EC, PC, $H_2O$ | None | $N_2$ | 80 | 33 | 7.1 | — | 6.9 | 10.9 | 1.7 | 2.0 | 22 | 5.3 | — | — | 3.2 | 2.0 |
| | | | | | | | | | | | 2.5 | 28.1 | 5.4 | — | — | — | 2.0 |
| | | | | | | | | | | | 3.0 | 28.7 | 5.3 | — | — | — | 1.8 |
| | | | | | | | | | | | 3.5 | — | — | — | 1.37 | — | — |
| | | | | | | | | | | | 4.0 | — | — | — | 1.7 | | |
| 4 | EC, PC, $H_2O$ | None | $N_2$ | 50 | 35 | 8.0 | 5.3 | — | 10.9 | 1.6 | 2.5 | 26.5 | 7.5 | 0 | — | 0.45 | 1.6 |
| | | | | | | | | | | | 3.0 | 29.2 | 7.44 | 0 | — | | 1.5 |
| | | | | | | | | | | | 3.5 | 29.6 | 7.36 | 0 | — | — | 1.5 |
| 5 | EC, PC, $H_2O$ | TEAB (0.5 g) | $N_2$ | 50 | 32.6 | 7.0 | 4.4 | — | 9.1 | 1.6 | 2.0 | 17.0 | 6.59 | 0 | — | 1.8 | 1.6 |
| | | | | | | | | | | | 2.5 | 24.0 | 6.4 | 0 | — | | |
| | | | | | | | | | | | 3.0 | 25.7 | 6.29 | 0 | — | | 1.4 |

TEAB = tetraethylammonium bromide

TABLE 2

| Example | Reactor Solution | Catalyst | Carrier Gas | Reactor Solution Temp. °C | Added Acid Gas ppmv | | | $CO_2$ Mol % | Time Hrs. | Effluent Acid Gas ppmv | | | Reactor Effluent $CO_2$ Mol % | EO Mol % |
|---|---|---|---|---|---|---|---|---|---|---|---|---|---|---|
| | | | | | $H_2S$ | COS | $SO_2$ | | | $H_2S$ | COS | $SO_2$ | | |
| 6 | EC, $H_2O$ | TEAB (2 g) | $N_2$ | 80 | 30 | 6.4 | | 2.3 | 5 | 19.7 | 4.5 | | 6.1 | <0.1 |
| 7 | EC, PC | None | Syn Gas | 100 | | | 26.0 | 1.67 | 1 | | | 0.72 | 1.69 | |
| | | | | | | | | | 2 | | | 0.23 | 1.75 | Trace |
| | | | | | | | | | 3 | | | 0.06 | 1.75 | Trace |
| | | | | | | | | | 5 | | | 0.035 | 1.7 | Trace |
| 8 | EC, PC | TEAB (0.5 g) | Syn Gas | 100 | 31 | | | 1.73 | 1 | | | 0.037 | 1.72 | |
| | | | | | | | | | 2 | | 0.037 | | 1.74 | |
| | | | | | | | | | 3 | | | 0.020 | 1.71 | |
| | | | | | | | | | 4 | | | 0.020 | 1.73 | 0.07 |

We claim:

1. A process for the removal of acid gases which are reactive with ethylene oxide from a gas mixture containing carbon dioxide, comprising contacting the gas mixture with ethylene carbonate containing a sufficient amount of ethylene oxide, whereby the ethylene oxide reacts chemically with the acid gases to produce reaction products which are more easily removable from the gas mixture.

2. The process of claim 1, wherein the ethylene oxide is provided by the decomposition of the ethylene carbonate.

3. The process of claim 1, wherein the temperature is in the range of 50° C. to 170° C.

4. The process of claim 3, wherein the temperature is in the range of 80° C. to 120° C., and the pressure is in the range of atmospheric pressure to 500 psig.

5. The process of claim 1, wherein the ethylene oxide is provided by the catalytic decomposition of the ethylene carbonate.

6. The process of claim 5, wherein the catalyst for the decomposition of the ethylene carbonate is tetraethylammonium bromide.

7. The process of claim 5, where the temperature is in the range of 80° C. to 120° C., and the pressure is in the range of atmospheric pressure to 500 psig.

8. The process of claim 1, further comprising supplying ethylene oxide to the ethylene carbonate.

9. The process of claim 1, wherein an inert solvent is used for the ethylene carbonate.

10. The process of claim 1, wherein the acid gases are from the group consisting of hydrogen sulfide, sulfur dioxide, hydrogen chloride, hydrogen bromide, hydrogen cyanide, carbonyl sulfide, and mercaptans.

* * * * *

UNITED STATES PATENT AND TRADEMARK OFFICE
CERTIFICATE OF CORRECTION

PATENT NO. : 4,540,552
DATED : September 10, 1985
INVENTOR(S) : B. C. Ream and C. Tellis It is certified that error appears in the above-identified patent and that said Letters Patent is hereby corrected as shown below:

In Table I, in the last column heading, after "Mole" insert --%--.

In Table I, Example 2,
line 1, delete "2.7";
line 1, change "2.8" to --2.7--;
line 1, under heading "Effluent $CO_2$ Mole" insert --2.8--.

In Table II
line 2, delete "2";
line 2, under heading "Time Hrs.", insert --2--;
line 2, delete "0.037";
line 2, change "1.74" to --0.037--;
line 2, under heading "Reactor Effluent $CO_2$ Mol % insert --1.74--.

Signed and Sealed this

Seventh Day of January 1986

[SEAL]

Attest:

DONALD J. QUIGG

Attesting Officer

Commissioner of Patents and Trademarks